United States Patent [19]

Levino

[11] Patent Number: 4,640,086
[45] Date of Patent: Feb. 3, 1987

[54] ELECTRICAL INSULATION TAPING MACHINE WITH UNIFORM TAPE TENSIONING

[75] Inventor: Andre J. Levino, Sewickley Township, Westmoreland County, Pa.

[73] Assignee: Westinghouse Electric Corp., Pittsburgh, Pa.

[21] Appl. No.: 793,053

[22] Filed: Oct. 30, 1985

[51] Int. Cl.⁴ .................. D07B 7/14; B65H 81/08
[52] U.S. Cl. ............................. 57/3; 57/6; 242/7.08
[58] Field of Search .............. 57/3, 6, 10, 11, 264; 242/7.08, 7.09, 7.11, 7.16, 75.2, 151; 226/186, 187

[56] References Cited

U.S. PATENT DOCUMENTS

| | | |
|---|---|---|
| 1,319,982 | 10/1919 | Wieczoreck .......................... 57/3 |
| 1,330,050 | 2/1920 | Beaver et al. ....................... 57/3 |
| 1,968,251 | 7/1934 | French ................................ 57/3 |
| 3,006,136 | 10/1961 | Grieve et al. ........................ 57/3 |
| 3,063,228 | 11/1962 | Sarracino ............................ 57/3 |
| 3,590,567 | 7/1971 | Bonokowski et al. .............. 57/3 |
| 4,346,550 | 8/1982 | Ferree ........................ 242/7.08 X |
| 4,574,574 | 3/1986 | Knaak ............................... 57/264 |

Primary Examiner—Donald Watkins
Attorney, Agent, or Firm—G. H. Telfer

[57] ABSTRACT

A taping machine of the type on which a head is mounted with a tape roll for release of tape upon head rotation about the position of the conductors being taped is provided with a tape tensioning device that is independent of tape on the roll.

5 Claims, 3 Drawing Figures

ELECTRICAL INSULATION TAPING MACHINE WITH UNIFORM TAPE TENSIONING

BACKGROUND AND SUMMARY OF THE INVENTION

This invention relates to machines for the application of electrical insulation tape to conductors and particularly to providing a high quality of taped conductors and avoiding tape breakage by maintaining uniform tension on the tape.

Electrical machines such as large motors and generators are often provided with coil conductors having an insulation on them in the form of a tape. For example, conductor strands having their individual insulation coating may be stacked together and taped, in one or more layers of insulation, forming an insulated coil turn. A representative insulating tape may be one that consists of two layers of different materials adhesively bound together, for example respectively of mica paper and a glass fiber material, which after complete wrapping is then assembled with other so wrapped conductors and subsequently applied with an exterior ground wall insulation after which the insulation is completed by a vacuum pressure impregnation of resinous insulation material. The present invention relates generally to machines and methods for the application of a tape to one or more electrical conductors.

Taping machines have been available for some time that offer a higher speed capability than can be achieved by manual taping. Such a machine is generally characterized by having a pair of heads extending around an axial location at which the conductors are passed. The heads are rotated and each has a mounting plate with a roll of tape on it. The roll of tape is pressed against the mounting plate by a spring loaded cover plate. Varying the pressure on the cover plate varies the friction and thus the tension required to cause the roll to turn. However, as winding proceeds the diameter of the roll of tape decreases with the result that the tension on the tape will vary and result in poor quality taped conductors. Unless the force is applied by the cover plate is adjusted, the tension automatically increases on the tape and it is likely to break. To avoid excessive tension variations, it has been necessary for the operator to stop the machine and readjust the tension on the cover plate over the tape roll frequently throughout operation. To be safe, these adjustments have to be made fairly frequently but the operator must judge carefully when to make adjustments and how much of an adjustment to make. It was found necessary in the use of an 8-inch roll of tape of the type described above with a mica paper layer and a glass fiber layer, the 8-inch roll having a total length of about 800 ft., that it was necessary to perform three or four cover plate adjustments during the course of running out the 8-inch roll in order to insure sufficiently uniform tape tension. These stoppages for adjustments of tension, or stoppages for breakage, result in a serious loss in productivity.

The present invention solves these problems by modifying existing machine as it is commercially available (No. 1010 Turn Taping Machine-CNC, Lexington Sales & Engineering Co., Inc., Louisville, KY.) in order to make the tensioning of the tape independent of the quantity of tape on the roll. The modification is such that the tape roll is allowed to run free, that is, if the previously used mounting plate spring loaded cover plate is present at all it is deliberately made quite loose so it is not applying any pressure of significance against the roll. The modification of the machine from that formerly used principally consists of the provision of a tape tensioning device that is also on the head or mounting plate but which is separate from the tape roll. This tape tensioning device may, quite easily and simply, be a wheel over which the tape passes en route to the conductors. The tensioning wheel is spring loaded against a friction clutch that acts as a brake on the tape, thus creating tension on the tape as it is wrapped around the coil wires. The tape tension is controlled by adjusting the spring pressure, such as by an adjusting nut. The tensioning wheel is supported on a bearing on a shaft that may be threaded into the mounting plate. The exterior surface of the wheel may be a material such as neoprene rubber that provides adequate friction for rotation with the tape as the tape is pulled due to the rotation of the head around the conductors. The tensioning wheel has a fixed diameter and runs at a constant speed in relation to the speed of rotation of the head. Thus the tape tension remains constant regardless of the tape roll diameter.

In addition, the invention includes the provision on the mounting plate at a location independent of the tape roll and the tensioning wheel of a free wheel or idler which serves to determine and fix the location of the tape path prior to its reception at the tensioning wheel. The free wheel makes sure this tape path is constant so that there remains throughout operation a substantial portion of the tensioning wheel in contact with the tape, such as to an extent of at least about 90° of the tension wheel's diameter or circumference. This means there is always a sufficient portion of the tape in frictional relation with the tensioning wheel to control the tension and that this portion is not changed as the tape roll diameter decreases.

It has been found that through the use of the present invention taping may proceed without interruption through the entire roll of tape having an original diameter of about 8 inches. Each time a roll is changed or a new roll is applied to the machine there is no disturbance of the setting of the tensioning device. It is simply necessary to remove the core of the old roll and thread the new tape through the tape path that includes going around the free wheel and around the tensioning wheel before being received at the conductors.

As the invention came about as a result of a clear need to improve the performance of the existing equipment it is apparent that it is readily retrofittable into such existing equipment as well as to such taping machines of new manufacture.

DESCRIPTION OF THE PREFERRED EMBODIMENTS

Figure 1:
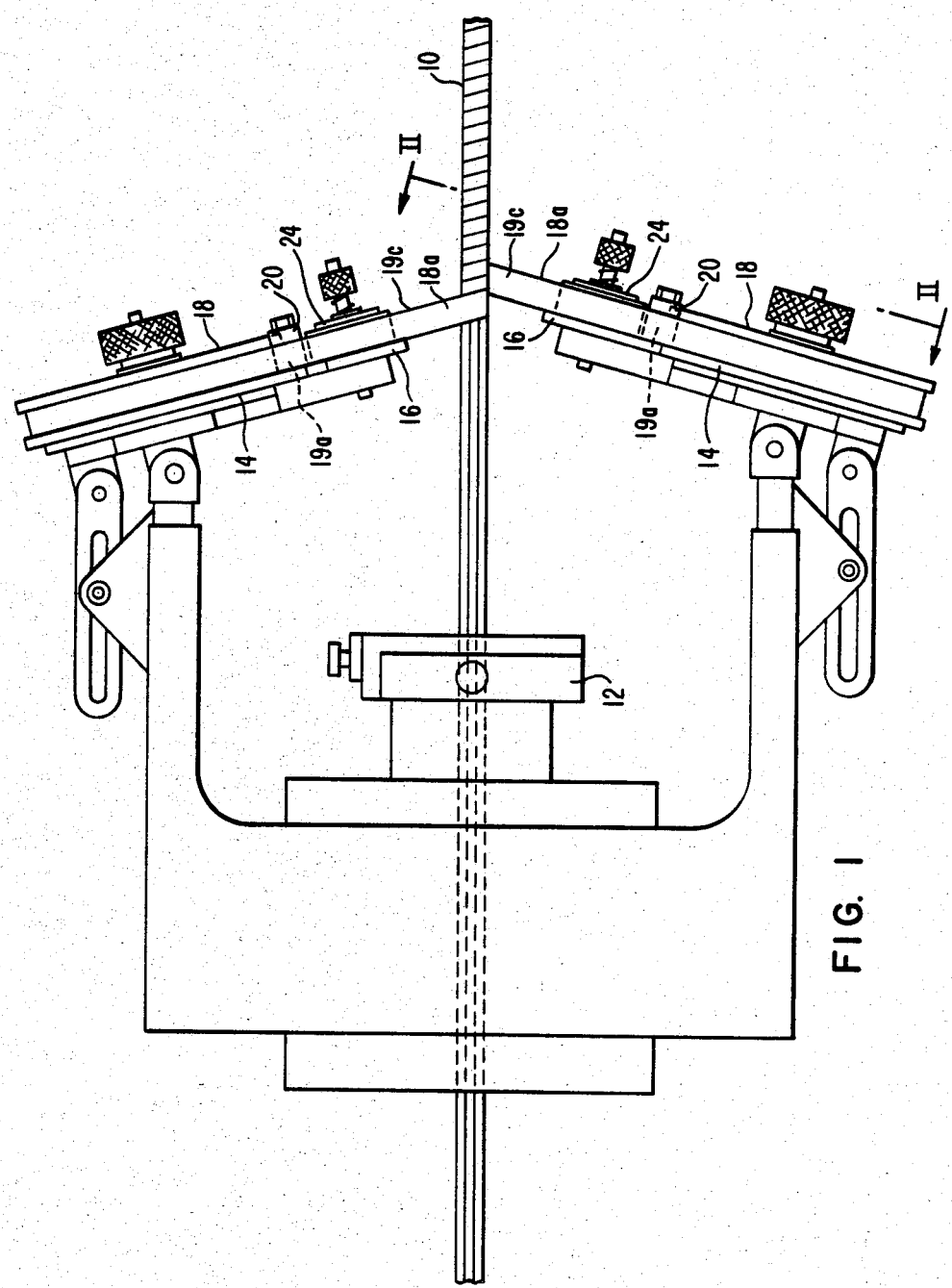
FIG. 1 is a partial, general, elevation view of taping apparatus in accordance with the present invention.

FIG. 1 is an illustration of insulation taping machine incorporating the present invention improves. Conductors 10 to be taped are fed through a central hub 12. Heads 14 are arranged for rotation about the axis defined by the conductors 10. Each head 14 comprises a mounting plate on which a cylindrical tape roll 18 is mounted by having its core affixed to the plate 16. A quantity of electrical insulation tape 18a is on the tape roll 18 with a layer of the tape fed through a tape path to the axis for taping the conductors. As the head 14 rotates, tape 18a is unwound from the roll 18, traverses the tape path and is wound on the conductors 10.

Figure 2:
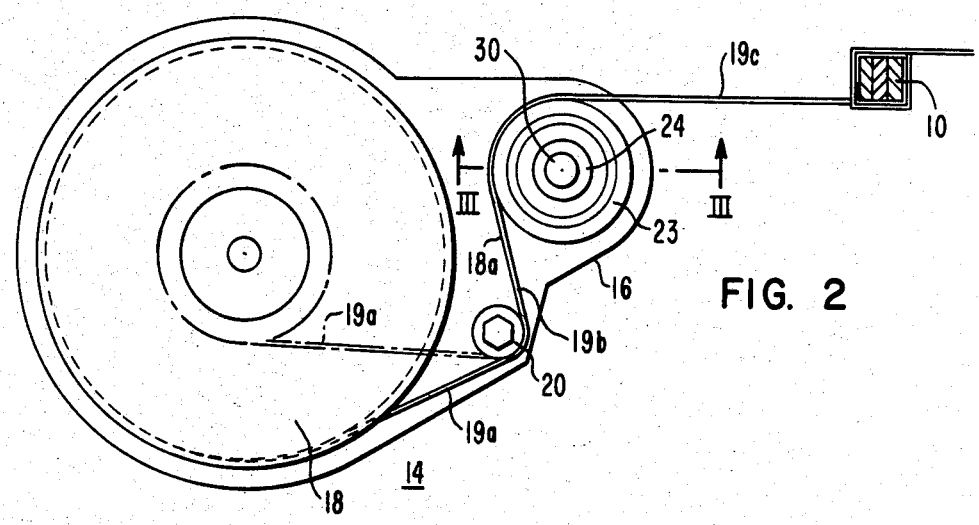
FIG. 2 is a plan view of a head of the apparatus of FIG. 1.

Referring also to FIG. 2; rather than proceeding directly from the tape roll 18 to the conductors 10, the path of tape 18a proceeds from the tape roll 18 on a first leg 19a to a free wheel or idler 20 that is upstanding from the mounting plate 16 at a location somewhat outside of the maximum diameter of a full roll of tape 18. The tape path then proceeds on a second leg 19b from the free wheel 20 to a tape tensioning device 22 that has a tensioning wheel about which the tape 18a runs from the tensioning device to the conductors 10 on its third and final leg 19c. As shown in the illustration the tensioning device 22 is located approximately on a radial line between the conductors 10 being taped and the center of the tape roll while the free wheel 20 is located at a position distinctly off of such a radial line. Assuming a counterclockwise direction of rotation of the head it can be seen that the tape 18a is fed from the left-hand side of the roll 18 over the free wheel 20 and under and around the right side of the tensioning wheel 22 to the conductors at the axis. Tape roll 18 does not rotate in relation to plate 16. As taping proceeds and the diameter of the tape roll 18 diminishes down to its minimum which is the core diameter of the tape roll it is seen that the path 19a from the tape roll to the free wheel 20 changes considerably. However, the second and third legs 19b and 19c of the tape path are not varied. The tape continues to maintain a considerable, approximately 25% contact with the tensioning device 22 on its way to the conductors 10.

The tape tensioning device 22 is mounted on the mounting plate 16 of the head 14 clear of the tape roll 18. Device 22 comprises a cylindrical tensioning wheel 23 over which the tape path passes and has means 24 for adjustably spring loading the wheel 23 against the plate 16 to tension the tape substantially uniformly between the tensioning device 22 and the conductors 10 so the conductors are taped with a constant tension independent of what quantity of tape 18a is on the roll 18.

Again referring to FIG. 1, the head 14 comprises a substantially planar plate 16 mounted at an angle in relation to the axis substantially the same as that which a centerline of the tape 18a has in relation to the axis. That is, the tape 18a is applied directly from the roll 18 through the tape path to the conductors 10 so that its angle from a radius is simply determined by the orientation of the mounting plate. Adaptation of the machine to equip it with the combination of the present invention requires no alteration of the manner in which the head 14 and mounting plate 16 are disposedon the previously available machine. It is merely necessary to use a mounting plate 16 equipped to support the free wheel 20 and the tensioning device 22. Such mounting plate 16 is shown in FIG. 2 and simply has departures from circularity to accommodate the additional elements 20 and 22 required. Such a plate 16 may simply be substituted for the original circular plate of the equipment.

The free wheel or idler 20 is simply a bolt threaded into the mounting plate with a free running sleeve on the fixed bolt.

Figure 3:
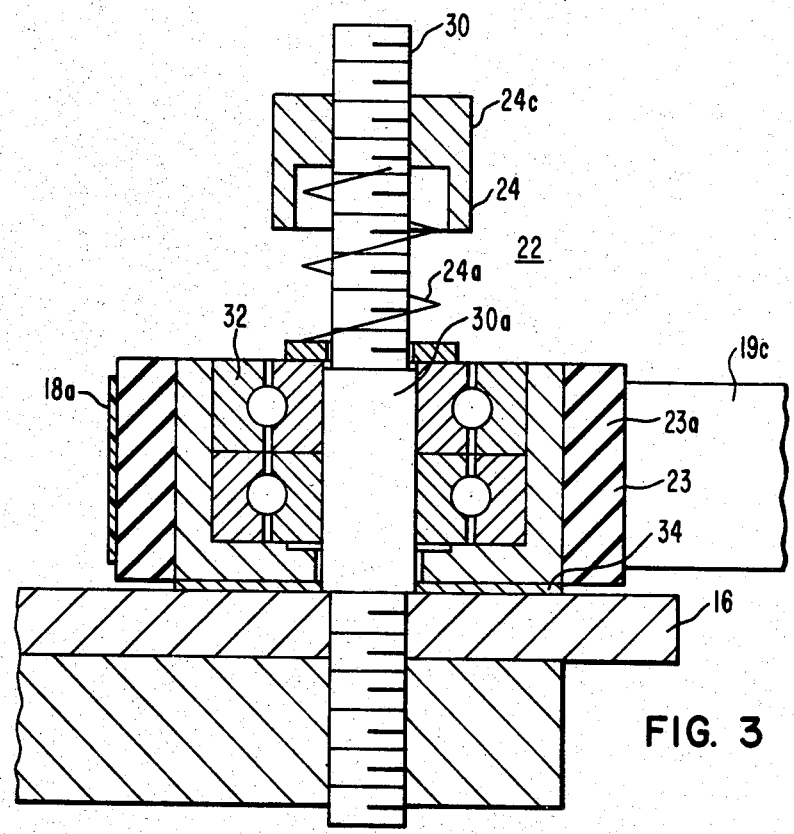
FIG. 3 is a cross-sectional view of the tensioning device of the apparatus of FIGS. 1 and 2.

The tensioning device is illustrated in greater detail in FIG. 3. It comprises a bolt 30 threaded into the mounting plate 16 at one end and having a shaft portion 30a on which a bearing 32 is mounted with the wheel 23 on the bearing. Wheel 23 includes an outer ring 23a of a material such as Neoprene rubber which is selected in order to provide sufficient friction for the tape to be retained thereon by friction. That is, as the tape 18a is pulled in the winding operation the movement of the wheel 23 is at a uniform velocity consistent with the velocity of rotation of the head 14. The tape tensioning device 22 has a means 24 for adjustably spring loading the wheel against the head to tension the tape. In this example, the spring loading means 24 includes an extended portion 30b of the shaft bolt 30 around which a spring 24a extends between a washer 24b which is on the bolt that bears against the bearing 32 of the wheel 23 and a threaded nut 24c on the extremity of the bolt 30. A clutch plate 34 of a material such as ordinary gasket material is provided between the wheel 23 and the mounting plate 16.

In operation, the wheel 23 is pressed against the clutch plate 34 and the mounting plate 16 by the spring 24a. Tension on the tape 18a is adjusted by the amount the spring 24a is compressed. With the tape path 19a, 19b, 19c, configured as shown in FIG. 2 there is relatively little need for adjustment of the adjusting nut 24c on the tensioning device 22. The apparatus may be operated through many rolls of tapes without requiring readjustment.

In a method of machine taping electrical insulation on conductors in accordance with the present invention using a machine of the character described, the steps are performed of feeding the tape 18a, while the head 14 is at standstill, from a roll 18 to the conductors 10 through a tape path that includes the above-mentioned first, second, and third legs 19a, 19b and 19c and then operating the machine to rotate the head 14 by which tape 18a is drawn from the tape roll 18 and applied to the conductors 10 with the tape roll 18 decreasing in size causing the location of the tape path first leg 19a to change to 19a' while the location of the tape path second and third legs, and the tension on the tape applied to the conductors, remains unchanged. The feeding of the tape 18a through the tape path is such as to make the tape contact the portion of the tension wheel surface of at least about 25% of its circumference which is maintained during the operating of the machine by reason of the fact that the tensioning device 22 is located more centrally along a radial line between the conductors and the center of the tape roll than is the free wheel 20 about which the tape passes before it reaches the tensioning device.

It is therefore seen that the present invention provides a simple yet highly effective modification of existing commercial equipment so that it can be used without requiring frequent readjustment of tape tension or suffering breakage of tape and fills a distinct need that has arisen with regard to such equipment.

I claim:
1. An electrical insulation taping machine comprising:
   a head mounted for rotation about an axis on which one or more electrical conductors to be taped are located;
   a cylindrical tape roll mounted on said head, said tape roll having a core affixed to said head and a quantity of electrical insulation tape wound on said core with a layer of said tape fed through a tape path to said axis for taping said conductors, said tape being unwound from said core, traversing said tape path, and wound on said conductors as said head rotates about said axis;

a tape tensioning device mounted on said head clear of said tape roll, said tape tensioning device comprising a cylindrical tensioning wheel over which said tape path passes and means for adjustably spring loading said wheel against said head to tension said tape substantially uniformly between said tensioning device and said conductors being taped independent of what quantity of said tape is on said core.

2. An electrical insulating taping machine in accordance with claim 1 wherein:

said head comprises a substantially planar plate mounted at an angle in relation to said axis substantially the same as that which a centerline of said tape has in relation to said axis, said head being mounted for rotation about said axis in a first direction while said tape feeds from said roll at a trailing location thereof in relation to said first direction of location;

said head having mounted thereon, in addition to said tape roll and said tape tensioning device, a cylindrical free wheel for determining said tape path between said roll and said tensioning device, said free wheel being located so said tape path encompasses an extent of the cylindrical surface of said tensioning wheel that remains uniform regardless of what quantity of said tape is on said core.

3. An electrical insulation taping machine in accordance with claim 1 wherein:

said tensioning wheel of said tape tensioning device is on a shaft threaded into said head and rotatably supported thereon by a bearing, the outer surface of said wheel being of a material providing sufficient friction between said wheel and said tape to maintain contact therebetween without slippage; said tape tensioning device has a friction clutch path around said shaft between said head and said tensioning wheel; said means for adjustably spring loading said wheel against said head comprises a spring disposed about said shaft between said wheel and an adjusting nut threaded on said shaft.

4. A method of machine taping electrical insulation on conductors, where the tape is to be prevented from breakage due to increased tension as the taping proceeds, using a machine of the type comprising a head on which a tape roll is mounted with the head rotated about the position of the conductors being taped thus feeding tape from the roll onto the conductors, comprising the steps of:

feeding the tape, while the head is at standstill, from the roll to the conductors through a tape path that includes a first leg from the roll to a free wheel on the head, a second leg from the free wheel to a tensioning wheel of a tensioning device that has a spring loading means for maintaining a uniform load on the tensioning wheel, and a third leg from the tensioning wheel to the conductors; and operating the machine to rotate the head by which tape is drawn from the tape roll and applied to the conductors with the tape roll decreasing in size causing the location of the tape path first leg to change while the location of the tape path second and third legs, and the tension on the tape applied to the conductors, remains unchanged.

5. A method of machine taping electrical insulation on conductors in accordance with claim 4 wherein:

the feeding of the tape through the tape path is such as to make the tape contact a portion of the tensioning wheel's surface of at least about 90° which is maintained during the operating of the machine due to the location of said free wheel and the tensioning wheel.

* * * * *